Inventor:
Wm W. Paget.
by Louis A. Maxson.
Atty.

Patented Apr. 9, 1940

2,196,227

UNITED STATES PATENT OFFICE 2,196,227

PUMPING APPARATUS UNLOADING MEANS

Win W. Paget, Michigan City, Ind., assignor to Sullivan Machinery Company, a corporation of Massachusetts Application January 5, 1937, Serial No. 119,127

5 Claims. (Cl. 137—153)

My invention relates to pumping apparatus, and more particularly to unloading means for such apparatus.

For unloading air compressors and the like, it is desirable to provide devices which will be very reliable, and simple in construction, occupy a minimum of space, and be very durable, so that long continued effective operation can be relied upon. A diaphragm type of opening mechanism for the inlet valves of an air compressor provides an extremely compact construction, but diaphragms are susceptible to breakage, and it is an object of my invention to provide an improved diaphragm construction which shall be protected to the maximum degree against stresses tending to cause its fracture or rupture. It is another object of my invention to provide an improved type of diaphragm operating mechanism for a compressor unloading device, in which great compactness is obtained, and simple means, occupying a minimum of space, for normally maintaining the diaphragm type operating means in its inactive position except when operating fluid is supplied to effect unloading, is provided. Generally, it is an object of my invention to provide an improved unloading means. Other objects and advantages of my invention will hereinafter more fully appear.

In the accompanying drawing, in which one illustrative embodiment which the invention may assume in practice has been shown—

Figure 1:
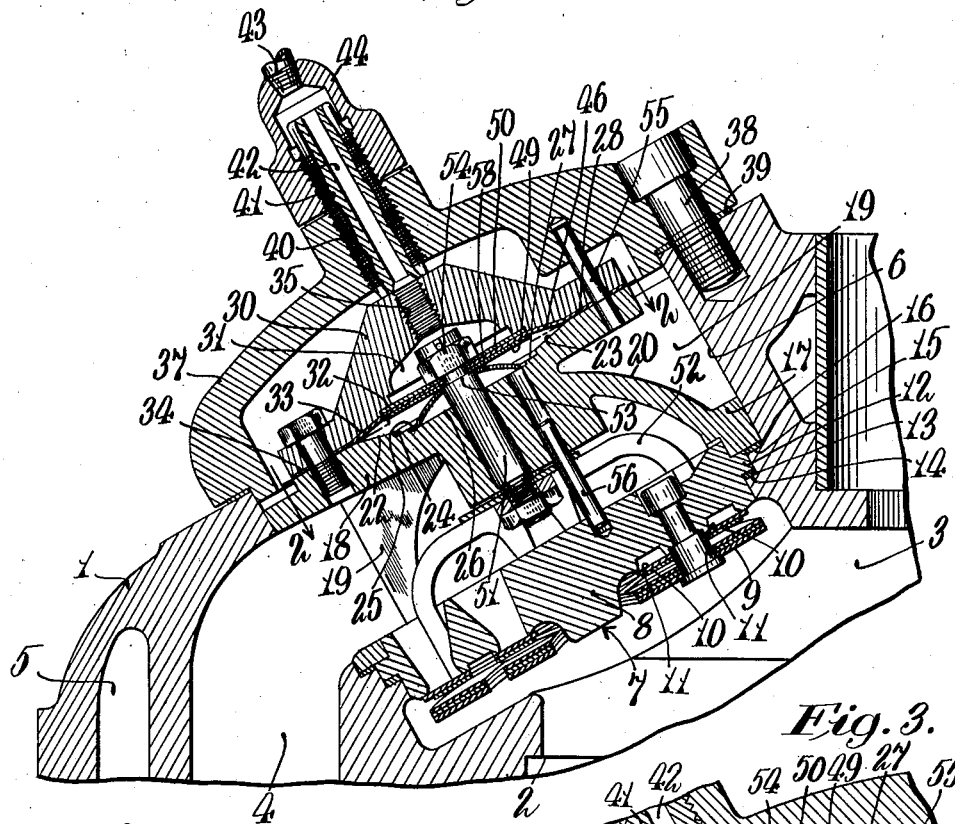
Figure 2:
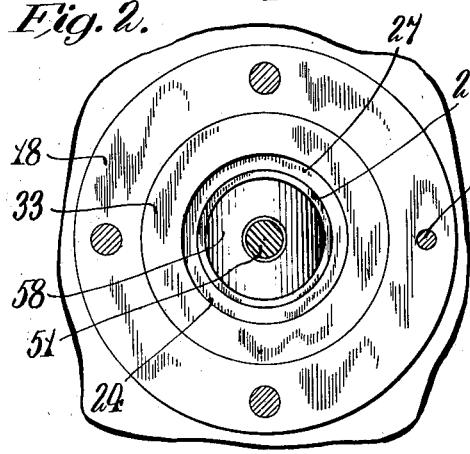
Figure 3:
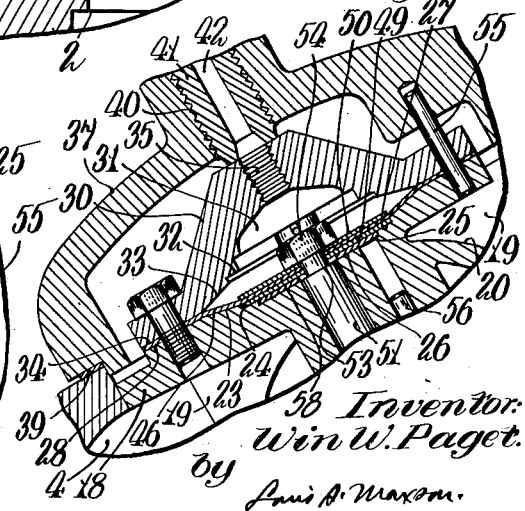

Fig. 1 is a fragmentary sectional view through one end of a compressor cylinder, showing an inlet valve device provided with unloading apparatus constructed in accordance with the illustrative embodiment of the invention, Fig. 2 is a horizontal section on the plane of the line 2—2 of Fig. 1, and Fig. 3 is a fragmentary section on the same plane as Fig. 1, showing a different relative position of the parts—that corresponding to unloading.

Referring to the drawing, it will be observed that 1 illustrates a portion of the cylinder head structure of a compressor, whose cylinder bore is immediately below, in terms of Fig. 1, the point of application of the reference character 2, whose clearance space is indicated at 3, one of whose inlet passages is indicated at 4, and a portion of whose cylinder jacket is shown at 5. A suitable chamber is formed at 6, within the element 1, to receive an inlet valve mechanism, generally designated 7; and said inlet valve mechanism, which comprises a seat element 8, a suitably supported guard 9, valve seating springs 10, and valve elements 11, is supported by a peripheral flange 12 and gasket 13 upon a shoulder 14 formed near the inner end of the chamber 6. Another annular shoulder 15, upon which a gasket 16 rests, is formed to the outside of the flange 13 upon the cylinder head; and an arcuate portion 17 of a follower member 18 is adapted to engage the flange 13 and the gasket 16 and clamp the inlet valve mechanism securely in position. The follower 18, in addition to its arcuate clamping portion 17, includes certain radially extending centering and stiffening flanges 19 and a dome-like portion 20 which is cut away to provide for free communication between the exterior side of the valve seat member 8 and the inlet passage 4. The back or outer portion of the follower member 18 is recessed, as at 22, and provides a relatively shallow frusto-conical annular seating surface 23 terminating at its inner end in a shallow cylindrical recess 24 whose central portion is further cut away, as at 25, so that a bottom surface 26, surrounded by a flat seating surface 27, lies at the bottom of the cut-away portion 22 of the member 18. An annular flat surface 28 is provided, surrounding the frusto-conical surface 23. A cover member 30 has a central recess 31 formed therein, surrounded by an annular plane shoulder 32, outside of which there lies a frusto-conical surface 33 facing oppositely to the frusto-conical surface 23; and a peripheral annular flat surface 34 is arranged opposite the surface 28. A bore, herein internally threaded, is provided at 35 for the admission of fluid into the recess 31 in the cover 30. A suitable outer cover element 37 is held by suitable screw devices 38 over the outside of the chamber 6, seating upon an appropriate gasket 39; and in a threaded bore 40 in the member 37 is a tubular clamping screw 41 through whose bore 42 operating fluid may be transmitted from a fluid supply connection 43 formed in a cap 44 threadedly connected with the outside of the member 41. A suitable flexible diaphragm 46 is clamped at its periphery between the surfaces 28 and 34, and has reinforcement plates 49 and 50 disposed at the opposite sides of its central portion, these reinforcement plates being of a thickness so that when they respectively rest upon the shoulders 27 and 32 the diaphragm is supported without any sharp bends therein throughout its entire free area, that is to say, the area to the inside of the peripheral clamped portion thereof. The reinforcing plates are, furthermore, of appropriate diameter substantially to fill the shallow recesses at whose bottoms are the shoulders mentioned. These reinforcing plates and the material of the diaphragm have alined perforations, and a member 51, carrying at its lower end the forks 52 which are adapted to engage the valves 11 to unseat the latter to effect unloading, provides a shoulder 53 between which and a nut 54 the reinforcing plates and the diaphragm are clamped. Suitable dowels 55 and 56 predetermine the relation of the follower to the cover and the valve device proper to the follower. A transversely bowed spring 58 surrounds the element 51 below the plate 49 and engages at its free portions the surface 26. This spring is compressible, when flattened as shown in Fig. 3, to a position in surface contact with surface 26, so that plate 49 may rest on annular shoulder or seating surface 27.

Air may be admitted to and vented from the connection 43 under the control of any suitable pressure-responsive or pressure-controlled device or any other desired control means, air being admitted through 43, for example, when the compressor discharge pressure reaches a desired maximum value, and vented after a drop of a desired amount. The pressure entering the connection 43 passes through the passage 42 and the passage 35 and acts on the top of the diaphragm, acting first upon the plate 50, and upon the unseating of the plate from the shoulder 32, acting upon the whole free area of the diaphragm. Accordingly, the stem member 51 moves the forks 52 downwardly and unseats the inlet valves, and the compressor is unloaded. When the air is vented through connection 43, the member 51, the forks 52 and the diaphragm structure are raised again to the position shown in Fig. 1, by the spring 58. In this position of the diaphragm, as well as in the position of Fig. 3, the diaphragm is protected against excessive strains, and accordingly the diaphragm will be long-lived and not likely to be ruptured at a time when continued operation of the compressor is important. The spring 58 is of very simple construction, and of a very durable type.

It will be evident that the invention whose illustrative embodiment has now been described is simple, rugged, durable, effective, and comprises only very easily produced parts.

While I have in this application specifically described one form which my invention may assume in practice, it will be understood that this form is shown for purposes of illustration and that the invention may be modified and embodied in various other forms without departing from its spirit or the scope of the appended claims.

What I claim as new and desire to secure by Letters Patent is:

1. In an unloading mechanism, in combination, a diaphragm chamber, a diaphragm secured therein, said diaphragm chamber having bounding walls recessed to receive diaphragm supporting plates and providing sloping surfaces outside said recesses, reinforcing plates clamped to said diaphragm and receivable in said recesses and of such thickness that said diaphragm rests smoothly on one of said plates and on one of said surrounding surfaces smoothly in each of the extreme positions thereof, with such plate supported upon a wall of its recess, and an unloading element operatively connected to said diaphragm.

2. In combination, in an unloading apparatus, means forming a diaphragm chamber having a plurality of concentric recesses in one wall thereof, a diaphragm movable towards and from said wall, a diaphragm reinforcing plate connected to said diaphragm and adapted to lie smoothly in one of said recesses, and a transversely bowed diaphragm biasing spring pressing against said plate and adapted to be compressed completely into and to lie smoothly in another of said recesses, and an unloading device operatively connected to said diaphragm.

3. In an unloading device, in combination, means providing a diaphragm chamber having opposed frusto-conical walls surrounding recesses, a diaphragm movable between opposite walls of said chamber, reinforcing plates therefor respectively receivable in the recesses at the opposite sides of said diaphragm to form smooth abutment surfaces for said diaphragm in each of its extreme positions, and means for applying operating pressure first to one of said reinforcing plates and, upon movement thereof, also to the flexed portion of said diaphragm.

4. In an unloading device, in combination, means providing a diaphragm chamber having opposed frusto-conical walls surrounding recesses, a diaphragm, reinforcing plates therefor connected to the opposite sides of said diaphragm and respectively receivable in the recesses at the opposite sides of said diaphragm, means for applying operating pressure first to one of said reinforcing plates and, upon movement thereof, also to the flexed portion of said diaphragm, and means including a transversely bowed annular spring for yieldingly pressing upon the other of said reinforcing plates opposing the movement of said diaphragm by operating pressure.

5. In an unloading device, in combination, means providing a diaphragm chamber having opposed frusto-conical walls surrounding recesses, a diaphragm, reinforcing plates therefor connected to the opposite sides of said diaphragm and respectively receivable in the recesses at the opposite sides of said diaphragm, means for applying operating pressure first to one of said reinforcing plates and, upon movement thereof, also to the flexed portion of said diaphragm, and means also receivable in a recess at one side of said diaphragm yieldingly pressing upon the other of said reinforcing plates and opposing the movement of said diaphragm by operating pressure, said yielding means providing an abutment, when compressed, for the reinforcing plate upon which it presses.

WIN W. PAGET.